W. F. OSGOOD.
Seed-Planter.

No. 41,263.

Patented Jan. 12, 1864.

Witnesses:
J. W. Coombs
Geo W. Reid

Inventor
W. F. Osgood
By Munn & Co
Atty

UNITED STATES PATENT OFFICE.

WILLIAM F. OSGOOD, OF LOWELL, MASSACHUSETTS, ASSIGNOR TO ORIN F. OSGOOD, OF SAME PLACE.

IMPROVEMENT IN CORN-PLANTERS.

Specification forming part of Letters Patent No. 41,263, dated January 12, 1864.

*To all whom it may concern:*

Be it known that I, WILLIAM F. OSGOOD, of Lowell, in the county of Middlesex and State of Massachusetts, have invented a new and Improved Seeding-Machine; and I do hereby declare that the following is a full, clear, and exact description of the same, reference being had to the accompanying drawings, making a part of this specification, in which—

Figure 1:
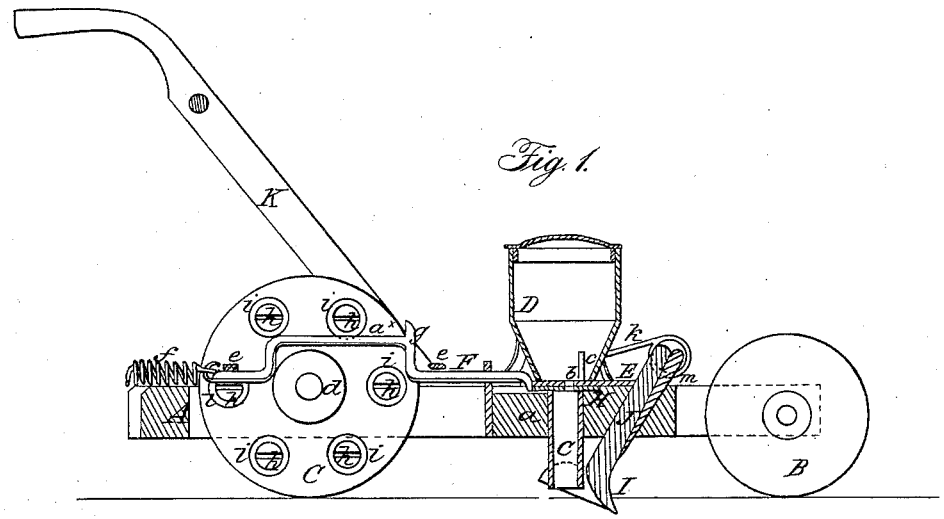
Figure 2:
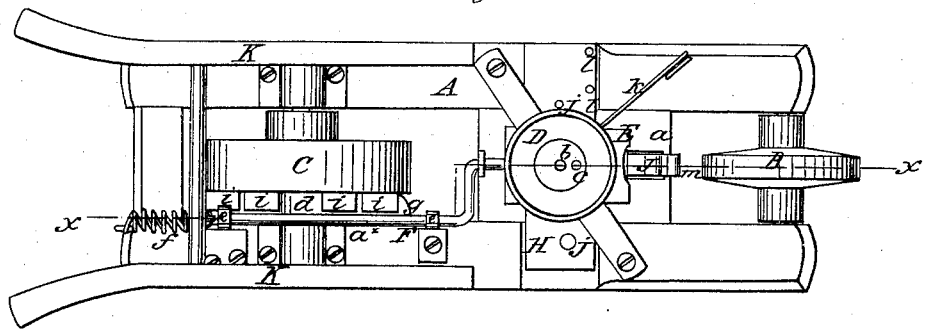

Figure 1 is a side sectional view of my invention, taken in the line $x\ x$, Fig. 2; Fig. 2, a plan or top view of the same.

Similar letters of reference indicate corresponding parts in the two figures.

This invention relates to a new and improved seeding-machine for planting seed in either hills or drills.

The object of the invention is to obtain a simple machine for the purpose specified, which may by a very simple adjustment be made to plant the seed in either hills or drills, and also be very readily adapted for planting different kinds of seed or seed of different sizes.

To enable those skilled in the art to fully understand and construct my invention, I will proceed to describe it.

A represents a rectangular frame, the front part of which is supported by a wheel, B, and the back part by a wheel, C, the latter, besides supporting the frame A, serving to operate the seed-distributing device, as will be presently shown.

D represents a seed box or hopper, the upper part of which may be of cylindrical and the lower part of conical form, as shown in Fig. 1. This seed box or hopper is supported in proper position over a cross-bar, $a$, of the frame A, and underneath the seed box or hopper there is placed a slide, E, in which a circular hole, $b$ is made, and to which, just back of the hole $h$, a vertical rod, $c$, is attached, the hole $b$ and rod $c$ being within the hopper D.

To the back end of the slide E a rod, F, is attached, said rod being of bent form, so that its front part may be directly in front of the center of the wheel C and attached to the center of the back end of the slide E, while the body or main portion of the rod may extend along at one side of the wheel C and be bent upward, as shown at $a^x$, to clear the axle $d$ of the wheel C, as shown in Fig. 1. The rod E works in suitable guides, $e\ e$, and has a spiral spring, $f$, attached to its back end. This spring $f$ has a tendency to keep the slide E drawn back to its fullest extent, at which point the hole $b$ in the slide is out of line with a vertical tube, G, which passes through the cross-bar $a$ in line with the center of the seed box or hopper. The rod F has a vertical bar, $g$, attached to its inner side at the front part of the bend $a^x$, and to the right side of the wheel C there are attached a series of pins, $h$, at equal distances apart, said pins being in a circle concentric with the wheel C, and each having a friction-roller, $i$, upon it. The bar $g$ on the rod F is in line with the friction-rollers $i$, and when the machine is drawn along or shoved forward and the wheel C rotates the rollers $i$ strike against the bar $g$ and shove the rod F and slide E forward, the spring $f$ drawing the rod and slide back as each roller passes the bar $g$. A reciprocating movement is thereby given the slide E.

H represents a metal plate, which is perforated with holes $j$ of different sizes. This plate is placed transversely on the frame A and underneath the slide E, and it may be adjusted on the frame A, so that either of its holes $j$ may register with the tube G, as desired. By adjusting this plate H in this way the machine may be adapted to planting seed of different kinds or sizes. This plate H is held in position by a spring-hook, $k$, which engages with any one of a series of holes, $l$, in the plate.

I represents a furrow-opener, the standard J of which passes obliquely through the cross-bar $a$ and is secured in position by a key or wedge, $m$. This furrow-opener is directly in front of the tube G. Each time the plate E is shoved forward the hole $b$ therein is brought in line with the hole $j$ in the plate H and the seed drops through the holes $b\ j$ into the tube G, the latter conveying the seed into the furrow. The vertical rod $c$ acts as a stirrer and insures the proper or free discharge of the seed.

When all the rollers $i$ are used the seed will be sown in drills, as the plate E is quickly operated. In order to drop the seed in hills, a portion of the rollers $i$ are removed, so that the plate E will be actuated at longer intervals.

The frame A is provided with handles K, and in sowing field-crops—such as corn, &c—a drag may be attached to the back part of the frame to serve as a seed-coverer. This arrangement forms a very convenient and simple device for planting seed either for garden or field crops, and one which will not be liable to get out of repair.

Having thus described my invention, what I claim as new, and desire to secure by Letters Patent, is—

The arrangement of the spring-bar F, constructed as shown, with the wheel C, rollers $i$, and slides E H, in the manner herein described.

WM. F. OSGOOD.

Witnesses:
A. J. SIMPSON,
E. F. SHERMAN.